(12) United States Patent
Sayama

(10) Patent No.: US 7,984,951 B2
(45) Date of Patent: Jul. 26, 2011

(54) HEADREST AND VEHICLE SEAT PROVIDED WITH THE SAME

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 2 days.

(21) Appl. No.: 12/525,632

(22) PCT Filed: Feb. 5, 2008

(86) PCT No.: PCT/JP2008/051879
§ 371 (c)(1),
(2), (4) Date: Aug. 3, 2009

(87) PCT Pub. No.: WO2008/096765
PCT Pub. Date: Aug. 14, 2008

(65) Prior Publication Data
US 2010/0001570 A1 Jan. 7, 2010

(30) Foreign Application Priority Data

Feb. 5, 2007 (JP) ................................ 2007-026169
Feb. 5, 2007 (JP) ................................ 2007-026170

(51) Int. Cl.
*A47C 7/36* (2006.01)

(52) U.S. Cl. ...................................................... 297/408
(58) Field of Classification Search .................. 297/391, 297/408, 404
See application file for complete search history.

(56) References Cited

U.S. PATENT DOCUMENTS

| 4,351,563 A * | 9/1982 | Hattori ........................... 297/408 |
| 4,511,180 A * | 4/1985 | Klaus ............................. 297/408 |
| 7,137,668 B2 * | 11/2006 | Kreitler ........................ 297/410 |
| 7,234,778 B1 * | 6/2007 | Toba ............................. 297/403 |
| 2007/0164593 A1 * | 7/2007 | Brockman .................... 297/408 |

FOREIGN PATENT DOCUMENTS

| DE | 10256642 B3 | 6/2004 |
| DE | 103 35 517 A1 | 3/2005 |
| JP | 01-164310 A | 6/1989 |
| JP | 07-011951 U | 2/1995 |
| JP | 2002-199960 A | 7/2002 |
| JP | 2005-349915 A | 12/2005 |
| JP | 2006-014950 A | 1/2006 |
| WO | WO 2005/120894 A1 | 12/2005 |

* cited by examiner

*Primary Examiner* — Milton Nelson, Jr.
(74) *Attorney, Agent, or Firm* — Drinker Biddle & Reath LLP

(57) ABSTRACT

A versatile and thin headrest can be tilted lightly and reliably from a head support state to a storage state by reducing an operation load. The headrest includes a support member mounted on the upper part of a backrest seat, a frame rotatably engaged with the support member, a frame urging element(s), and a lock mechanism provided between the frame and the support member. The lock mechanism includes locking members disposed on the support member and formed with engagement groove parts, a movable operation lever having concave parts formed directed toward the support member side, fixing members pivotally supported on the frame and capable of being crossingly engaged with and disengaged from the engagement groove parts along with the movement of the operation lever, and an operation lever urging element(s) for urging the operation lever so that the fixing members are urged in the direction of the engagement groove parts.

12 Claims, 11 Drawing Sheets

HEADREST AND VEHICLE SEAT PROVIDED WITH THE SAME

CROSS-REFERENCE TO RELATED APPLICATIONS

This application is the U.S. national phase of the International Patent Application No. PCT/JP2008/051879 filed Feb. 5, 2008, which claims the benefit of Japanese Application No. 2007-026169, filed Feb. 5, 2007, and Japanese Application No. 2007-026170, filed Feb. 5, 2007, the entire contents of which are incorporated herein by reference.

This application is also related to the subject matter of International Patent Application No. PCT/JP2008/051880 filed Feb. 5, 2008.

BACKGROUND

The present invention relates to a headrest and a vehicle seat provided with the headrest. More particularly, it relates to a headrest capable of being in a head support state in which the headrest is raised with respect to a backrest seat and being tilted from the head support state to a storage state, and a vehicle seat provided with the headrest.

Generally, on the upper part of a backrest seat of a vehicle seat, a headrest for protecting the passenger's head is mounted. Conventionally, there has been publicly known a technique in which the lower parts of a pillar of the headrest are attached to a transverse rod extending in the right-and-left direction in the backrest seat so as to be rotatable in the front-and-rear direction, the pillar is attached so as to be movable in the right-and-left direction, and the headrest is tilted to the rear and stored after being moved transversely (see Japanese Unexamined Utility Model Application Publication No. 7-11951 ("the '951 Publication")).

Also, there has been proposed a technique in which a headrest includes a pillar having a transverse shaft part and mounted on the upper part of a seat back; a headrest main body the lower part side of which is rotatably provided in the transverse shaft part of the pillar; and a tilting mechanism incorporated in the headrest main body to tilt the headrest main body backward, and the tilting mechanism includes a headrest urging element(s) for urging the upper part of the headrest main body to the rear side; a lock plate provided on the transverse shaft part of the pillar and having a first locking part; a latch provided on the headrest main body and having a second locking part capable of being locked to the first locking part of the lock plate; a latch urging element(s) for urging the latch so as to lock the second locking part to the first locking part of the lock plate when the headrest main body is in a raised state in which the headrest main body is approximately vertical; and an actuator for unlocking the second locking part of the latch from the first locking part of the lock plate against the urging force of the latch urging element(s) (Japanese Unexamined Patent Application Publication No. 2005-349915 ("the '915 Publication")).

Furthermore, there has been proposed a technique in which in a tiltable headrest in which a bracket can be moved between a folded position and an upright position, a concave part is formed in a lock reciprocating member and a lock member respectively, and the lock reciprocating member can be made slidable between a lock position and an unlock position by a spring (International Patent Publication WO2005/120894A1 ("the '894 Publication)).

The publicly known technique described in the '951 Publication has a problem in that because the rotation supporting point of the headrest is present in the upper part of the backrest seat under the headrest, the headrest rotates backward greatly together with the pillar and therefore the displacement thereof is large, so that the space occupied at the storage time is large.

That is to say, when the headrest is tilted to the rear, one headrest fully projects to the rear side of the backrest seat. Also, this technique has a problem in that a pillar movement grooves must be formed in the upper part of the backrest seat, so that the construction is complicated, and also the backrest seat cannot be used in common with another backrest seat.

The publicly known technique described in the '915 Publication has a problem in that although the entire of the tilting mechanism of the headrest can be accommodated in the headrest main body, and the headrest has excellent versatility, since the first locking part of the lock plate and the second locking part provided on the latch to be locked to the first locking part are used, the lock plate and the latch are arranged in the tiltable direction of the headrest, so that some degree of size must be secured in the front-and-rear direction, and therefore there is a limit to the thinning of the headrest.

In the publicly known technique described in the '894 Publication, the concave part is formed in the lock reciprocating member and the lock member respectively, and the lock reciprocating member can be made slidable between a lock position and an unlock position by the spring. However, since the lock position and the unlock position are switched over by two members of the lock reciprocating member and the lock member, a spring force urging the bracket toward the folding direction is directly applied to the lock reciprocating member and the lock member. Therefore, the reciprocating motion of the lock reciprocating member is sometimes difficult to perform smoothly. Also, in the case where a plurality of lock members are present, the lock reciprocating member and all of the lock members are made slidable between the lock position and the unlock position by one lock reciprocating member, so that the size of the lock reciprocating member increases, so that this headrest has a disadvantage that a greater load is applied to the lock reciprocating member.

SUMMARY

An object of the present invention is to provide a headrest that has excellent versatility and thin shape, and can be tilted lightly from a head support state to a storage state by reducing an operation load, and a vehicle seat provided with this headrest.

Also, another object of the present invention is to provide a headrest capable of reliably operating a lock mechanism for switching over the head support state and the storage state, and a vehicle seat provided with this headrest.

To solve the above problems, according to various embodiments of the invention discussed below, in the headrest capable of being in a head support state in which the headrest is raised with respect to a backrest seat and being tilted from the head support state to a storage state, the headrest includes a support member mounted on the upper part of the backrest seat; a frame engaged rotatably with the support member; a frame urging element(s) for urging the frame to one side; and a lock mechanism provided between the frame and the support member, and is characterized in that the lock mechanism includes a locking member disposed on the support member and formed with an engagement groove part; an operation lever having a concave part formed so as to be directed toward the support member side and being movable; a fixing member pivotally supported on the frame rotatably and disposed so as to be capable of being crossingly engaged with and disengaged from the engagement groove part of the locking member along with the movement of the operation lever; and an operation lever urging element(s) for urging the operation lever so that the fixing member is urged in the engagement groove part direction of the locking member.

Also, according to an embodiment of the invention, in the headrest capable of being in a head support state in which the headrest is raised with respect to a backrest seat and being tilted from the head support state to a storage state, the headrest includes a pillar having a transverse shaft part and mounted on the upper part of the backrest seat; a headrest frame rotatably engaged with the transverse shaft part of the pillar by combining a main frame and a sub frame; a headrest frame urging element(s) for urging the headrest frame to one side; and a lock mechanism provided between the headrest frame and the pillar, and is characterized in that the lock mechanism includes a latch plate disposed on the transverse shaft part of the pillar and formed with an engagement groove part along the transverse shaft part; a ratchet lever provided with an engagement concave part formed so as to be directed toward a pillar side and sliding in the transverse direction; a ratchet one end side of which is engaged with the engagement concave part of the ratchet lever and the other end side of which can be engaged crossingly with the engagement groove part of the latch plate; and a ratchet lever urging element(s) for urging the ratchet lever so that the ratchet is urged in the engagement groove part direction of the latch plate, the ratchet being switchable between an engagement position at which the ratchet is positioned in the engagement groove part of the latch plate, and a disengagement position at which the ratchet comes off the engagement groove part.

As described above, when the headrest is kept in the head support state in which the headrest is raised with respect to a backrest seat and is tilted from the head support state to the storage state as the lock mechanism, the operation lever (ratchet lever), the locking member (latch plate), and the fixing member (ratchet) are used, and the engagement position and the disengagement position are switched over via the fixing member (ratchet) one end side of which is engaged with the engagement concave part of the operation lever (ratchet lever) and the other end side of which can be engaged crossingly with the engagement groove part of the locking member (latch plate). Therefore, the lock mechanism itself can be configured so as to be compact without requiring a wide width.

In the above-described configuration, according to an embodiment of the invention, it is preferable that one end side of the fixing member be formed into a circular shape, and the operation lever hold the circular one end side of the fixing member and allow the rotation of the fixing member.

Also, in the above-described configuration, according to an embodiment of the invention, it is preferable that one end side of the ratchet held in the engagement concave part of the ratchet lever be formed into a circular shape, and the engagement position and the disengagement position can be switched over by the rotation of the ratchet along with the movement of the ratchet lever.

By making one end side of the fixing member (ratchet), which is held in the engagement concave part of the operation lever (ratchet lever), circular, one end side of the fixing member (ratchet) is turned smoothly in the engagement concave part of the operation lever (ratchet lever) along with the movement of the operation lever (ratchet lever). Therefore, the fixing member (ratchet) can be engaged with and disengaged from the engagement groove part of the locking member (latch plate), so that the lock can be released exactly.

In the above-described configuration, according to an embodiment of the invention, the configuration can be made such that the ratchet lever is formed with at least two engagement concave parts, and at least two ratchets are held in and engaged with the engagement concave parts. Thus, since the plurality of (at least two) ratchets are held in the engagement concave part of the ratchet lever, by the operation of the ratchet lever, all of the ratchets are moved simultaneously in synchronization, so that the ratchets can be prevented from moving while turning or not turning individually.

That is to say, since one end side of the ratchet is held in and engaged always with the engagement concave part of the ratchet lever, a state in which only one ratchet turns can be prevented. Further, the ratchet turns smoothly following the movement of the ratchet lever, malfunction is prevented, and the switching-over by the lock mechanism can be performed reliably.

In the above-described configuration, according to an embodiment of the invention, the configuration can be made such that by operating the ratchet lever against the ratchet lever urging element(s), the ratchet is taken away from the engagement groove part of the latch plate. Thus, at the normal time, the ratchet lever is urged in the direction such that the ratchet is engaged with the engagement groove part of the latch plate. Therefore, when the ratchet is taken away from the engagement groove part of the latch plate by operating the ratchet lever against the ratchet lever urging element(s), the headrest frame is tilted to the storage state by the headrest frame urging element(s). Therefore, the lock can be released by one operation (one action).

In the above-described configuration, according to an embodiment of the invention, it is preferable that a distance between the rotation axis of the ratchet and the position of one end side of the ratchet engaging with the engagement concave part of the ratchet lever be longer than a distance between the rotation axis of the ratchet and the position of the ratchet engaging with the engagement groove part of the latch plate. By this configuration, when the ratchet is turned from the engagement position at which the ratchet is positioned in the engagement groove part of the latch plate to the disengagement position at which the ratchet comes off the engagement groove part (when the lock is released), the ratchet can be moved with less force, so that the releasing load at the time when the lock is released can be decreased. That is to say, the link ratio can be set, and thereby the releasing load can be adjusted.

In the above-described configuration, according to an embodiment of the invention, the configuration is preferably made such that the ratchet rotates in the range of rotation angle of 20 to 40 degrees around the rotation axis of the ratchet. Thus, by making the configuration such that the ratchet rotates in the range of rotation angle of 20 to 40 degrees around the rotation axis of the ratchet, the transverse displacement of the ratchet lever for the disengagement caused by the turning of the ratchet from the engagement position to the disengagement position and the turning of the ratchet can be made optimum. Thus, the displacement relating to the operation caused by the lock mechanism can be adjusted.

To solve the above problems, according to an embodiment of the invention, in the vehicle seat provided with a headrest capable of being in a head support state in which the headrest is raised with respect to a backrest seat and being tilted from the head support state to a storage state, the vehicle seat is characterized in that the headrest includes a support member mounted on the upper part of the backrest seat; a frame engaged rotatably with the support member; a frame urging element(s) for urging the frame to one side; and a lock mechanism provided between the frame and the support member, and the lock mechanism includes a locking member disposed on the support member and formed with an engagement groove part; an operation lever having a concave part formed so as to be directed toward the support member side and being movable; a fixing member pivotally supported on the frame rotatably and disposed so as to be capable of being crossingly engaged with and disengaged from the engagement groove part of the locking member along with the movement of the operation lever; and an operation lever urging element(s) for urging the operation lever so that the fixing member is urged in the engagement groove part direction of the locking member.

In the above-described configuration, according to an embodiment of the invention, the configuration is preferably made such that one end side of the fixing member is formed into a circular shape, and the operation lever holds the circular one end side of the fixing member and allows the rotation of the fixing member.

Also according to the vehicle seat according to an embodiment of the invention, in the vehicle seat provided with a headrest capable of being in a head support state in which the headrest is raised with respect to a backrest seat and being tilted from the head support state to a storage state, the vehicle seat is characterized in that the headrest includes a pillar having a transverse shaft part and mounted on the upper part of the backrest seat; a headrest frame rotatably engaged with the transverse shaft part of the pillar by combining a main frame and a sub frame; a headrest frame urging element(s) for urging the headrest frame to one side; and a lock mechanism provided between the headrest frame and the pillar, the lock mechanism includes a latch plate disposed on the transverse shaft part of the pillar and formed with an engagement groove part along the transverse shaft part; a ratchet lever provided with an engagement concave part formed so as to be directed toward a pillar side and sliding in the transverse direction; a ratchet one end side of which is engaged with the engagement concave part of the ratchet lever and the other end side of which can be engaged crossingly with the engagement groove part of the latch plate; and a ratchet lever urging element(s) for urging the ratchet lever so that the ratchet is urged in the engagement groove part direction of the latch plate, the ratchet being switchable between an engagement position at which the ratchet is positioned in the engagement groove part of the latch plat, and a disengagement position at which the ratchet comes off the engagement groove part.

In the above-described configuration, according to an embodiment of the invention, the configuration is preferably made such that one end side of the ratchet held in the engagement concave part of the ratchet lever is formed into a circular shape, and the engagement position and the disengagement position can be switched over by the rotation of the ratchet along with the movement of the ratchet lever.

As described above, according to the above-described vehicle seat, a vehicle seat having the above-described headrest function can be provided.

According to embodiments of the invention, there can be provided a headrest that has excellent versatility and thin shape, and can be tilted lightly from a head support state to a storage state by reducing an operation load, and a vehicle seat provided with this headrest. Also, according to an embodiment of the invention, there can be provided a headrest capable of reliably operating a lock mechanism for switching over the head support state and the storage state, and a vehicle seat provided with this headrest.

According to embodiments of the invention, the lock mechanism itself can be configured so as to be compact without requiring a wide width. That is to say, the lock mechanism can be provided in a narrow headrest, so that the headrest can be tilted by a compact configuration. Also, the headrest in accordance with the present invention can be mounted on any type of backrest seat if the backrest seat can be mounted with the support member (pillar). Thus, the backrest seat need not be provided with a mechanism for tilting the headrest, so that the whole configuration can be simplified.

According to embodiments of the invention, the lock can be released exactly.

According to embodiments of the invention, the malfunction of the lock mechanism can be prevented, and switching-over can be performed reliably by the lock mechanism.

According to embodiments of the invention, the lock can be released by one operation (one action).

According to embodiments of the invention, a so-called link ratio can be set, and thereby the releasing load can be adjusted.

According to embodiments of the invention, the displacement relating to the operation can be adjusted.

According to embodiments of the invention, a vehicle seat provided with the headrest in accordance with the present invention can be provided.

BRIEF DESCRIPTION OF THE DRAWINGS

The invention is described below with reference to various embodiments of the invention illustrated in the drawings and discussed in the following sections.

DETAILED DESCRIPTION OF THE EMBODIMENTS

An embodiment of the present invention will now be described with reference to the accompanying drawings. The members, arrangements, and the like explained below do not restrict the present invention, and needless to say, can be changed variously based on the teachings of the present invention as would be understood by one of ordinary skill in the art.

Figure 1:
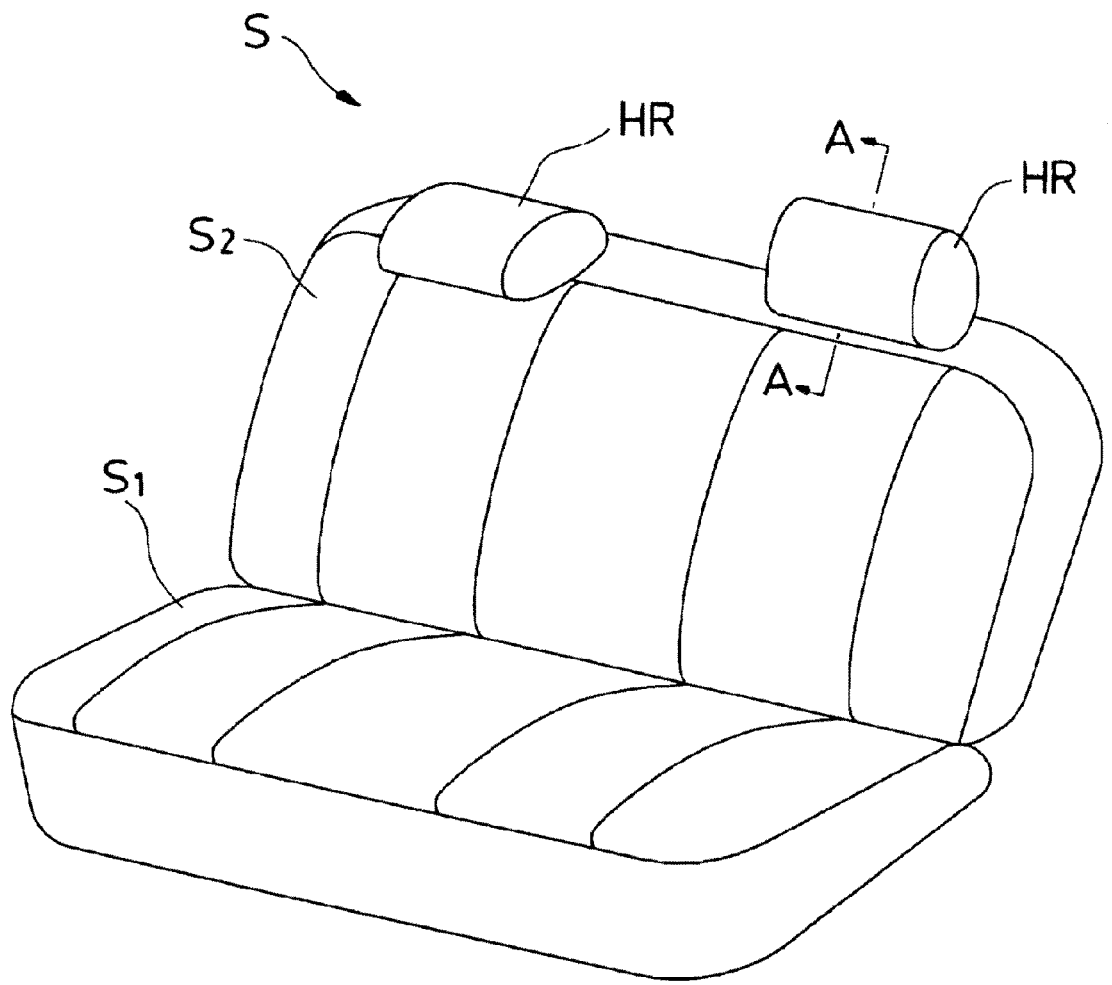
FIG. 1 is a perspective view of a seat provided with a backrest seat and a headrest.

A vehicle seat S may be, e.g., a rear seat for an automobile. As shown in FIG. 1, the vehicle seat S includes a seating seat S1 and a backrest seat S2, and a headrest HR is provided in the upper part of the backrest seat S2. The seating seat S1 and the backrest seat S2 have a publicly known configuration in which a frame, a pad, and a seat cover material for covering the frame and the pad are provided. The explanation of the details of this configuration is omitted. In this embodiment, the example of a rear seat for an automobile is shown. However, the vehicle seat S may be a front seat or an intermediate seat of vehicle if the seat is mounted with a headrest.

The headrest HR of this embodiment can be mounted on the backrest seat S2 by using a pillar serving as a support member so as to be moved up and down. As a height adjusting mechanism for moving the headrest HR up and down, a publicly known mechanism can be used. Therefore, the explanation of this mechanism is omitted.

As shown in FIG. 1, the headrest HR of this embodiment can be tilted from a head support state in which the headrest HR is raised with respect to the backrest seat S2 to a storage state (in the example shown in FIG. 1, the left-hand side in the figure shows the storage state).

The headrest HR of this embodiment includes, as main components, a pillar 1 serving as a support member, a headrest frame 2 serving as a frame, and a headrest frame urging element(s) 3 serving as a frame urging element(s), and a lock mechanism 4.

Figure 3:
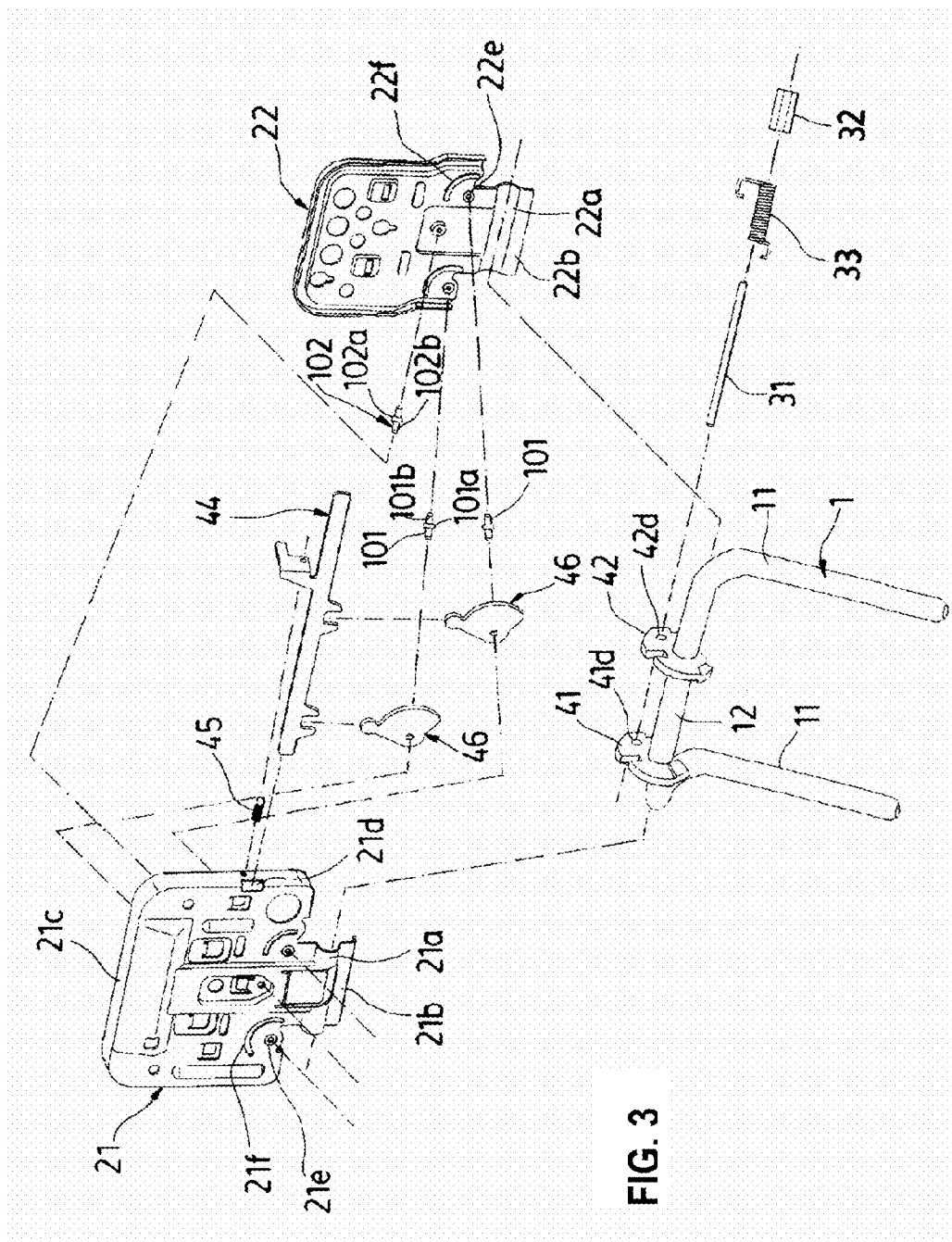
FIG. 3 is an exploded perspective view of a headrest frame and a lock mechanism.
Figure 9:
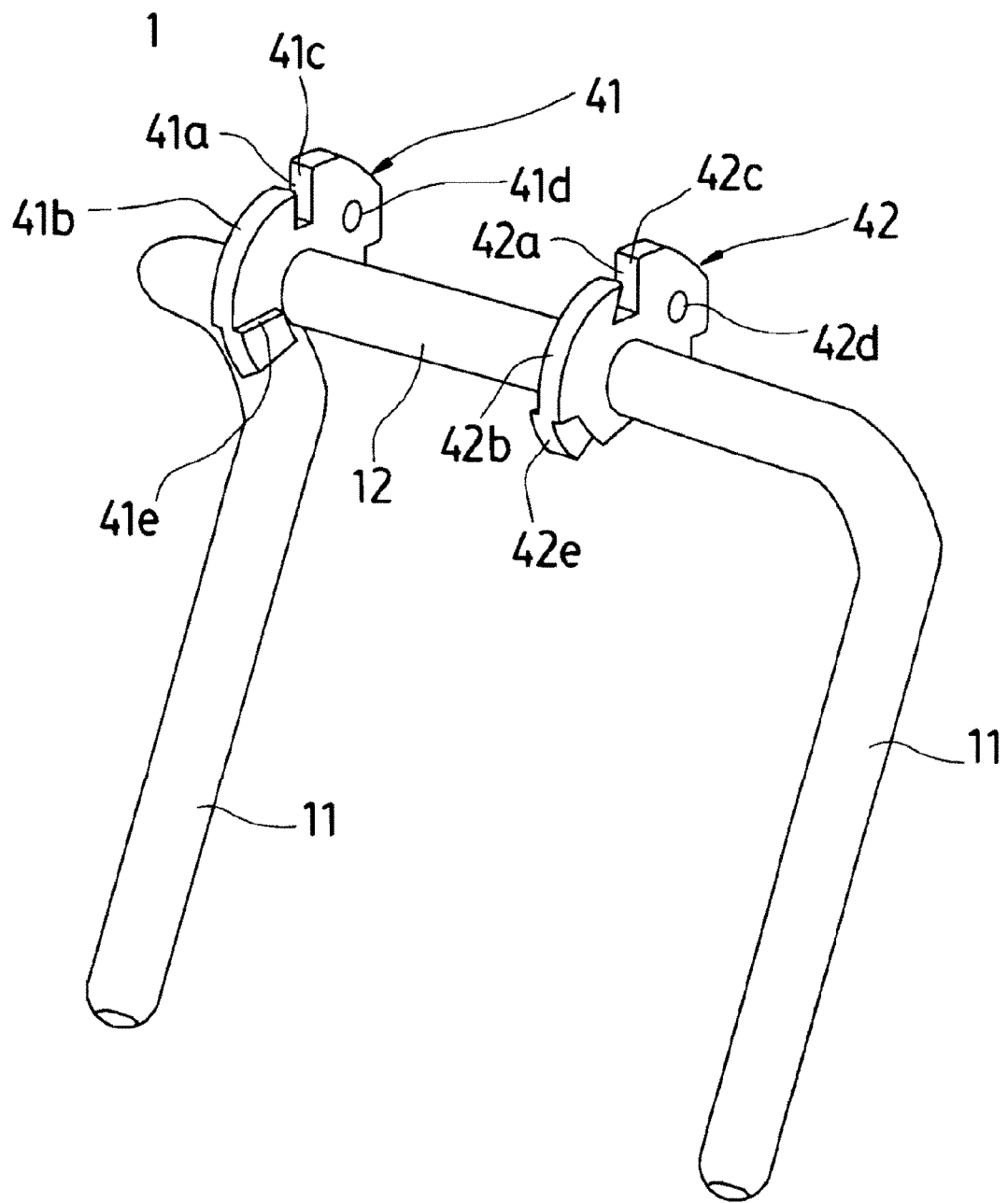
FIG. 9 is a perspective view of a pillar.

As shown in FIGS. 3 and 9, the pillar 1 serving as a support member of this embodiment has two leg parts 11, 11 mounted on the upper part of the backrest seat S2, and a transverse shaft part 12 connecting the two leg parts 11, 11 to each other. To the transverse shaft part 12 of the pillar 1, latch plates 41 and 42 serving as a locking member are fixed in the direction perpendicular to the axis of the transverse shaft part 12 by welding or the like at a predetermined interval. A portion between the latch plates 41 and 42 of the transverse shaft part 12 is rotatably held by substantially semicircular concave parts 21a and 22a formed in the lower part of a headrest frame 2 (a main frame 21 and a sub frame 22) serving as a frame, described later.

The latch plates 41 and 42 of this embodiment constitute a part of the lock mechanism 4, described later.

Figure 6:
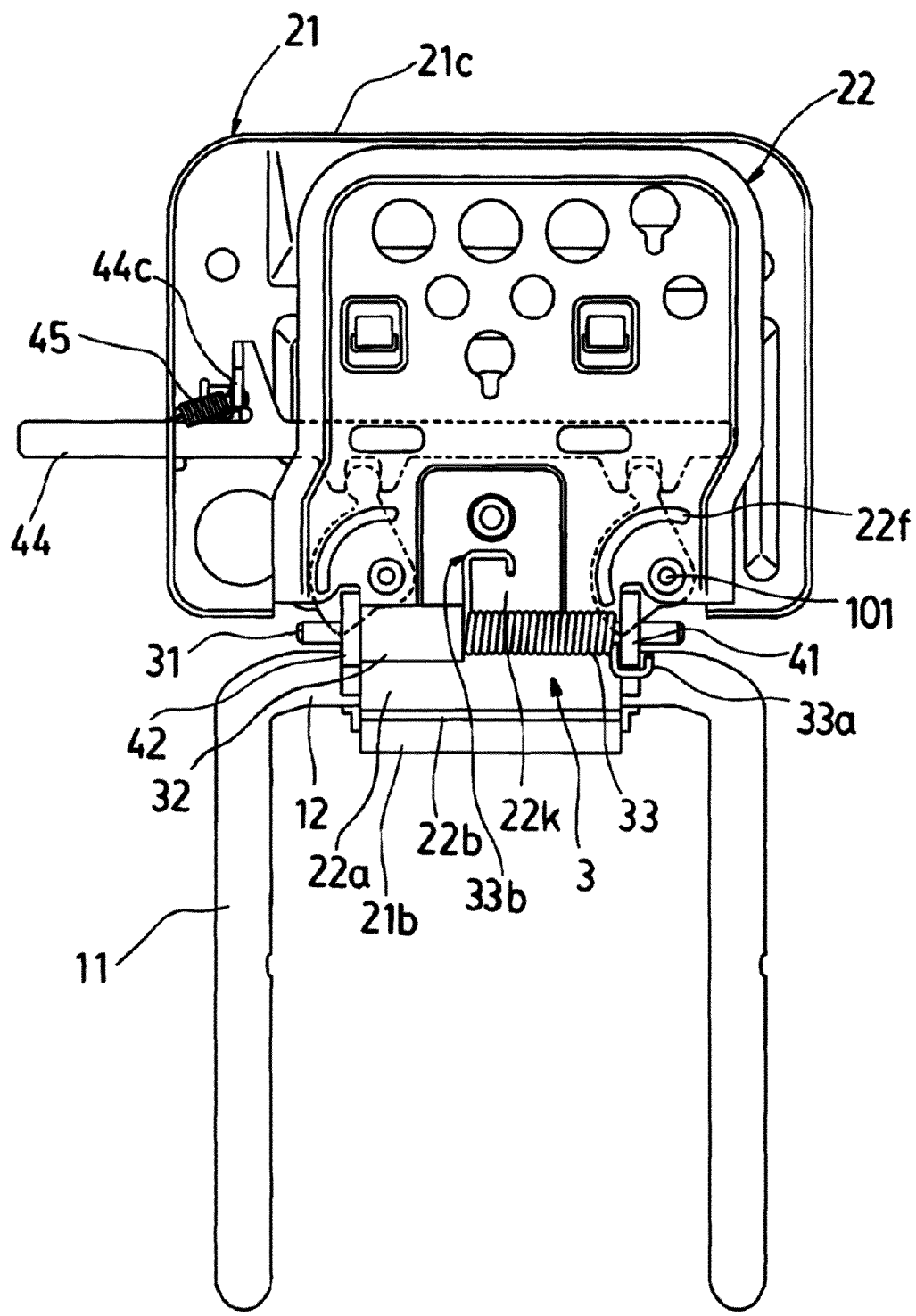
FIG. 6 is a rear view of FIG. 4.

As shown in FIGS. 3 and 6, the headrest frame 2 serving as a frame of this embodiment is rotatably engaged with the transverse shaft part 12 of the pillar 1 as described above, and is configured by combining the sub frame 22 with the main frame 21 so that the sub frame 22 enters into the main frame 21. In the headrest frame 2 consisting of the main frame 21 and the sub frame 22, a ratchet lever 44 serving as an operation lever and a ratchets 46 serving as a fixing member are held. The main frame 21 and the sub frame 22 are assembled integrally by crimping from both external sides with rivets 101 and 102 being held therebetween. Also, the rivet 101, 102 has a larger diameter in a central part 101a, 102a, and is formed with a caulking part 101b, 102b on both sides. The ratchet lever 44 and the ratchets 46 constitute the lock mechanism 4, described later.

Figure 4:
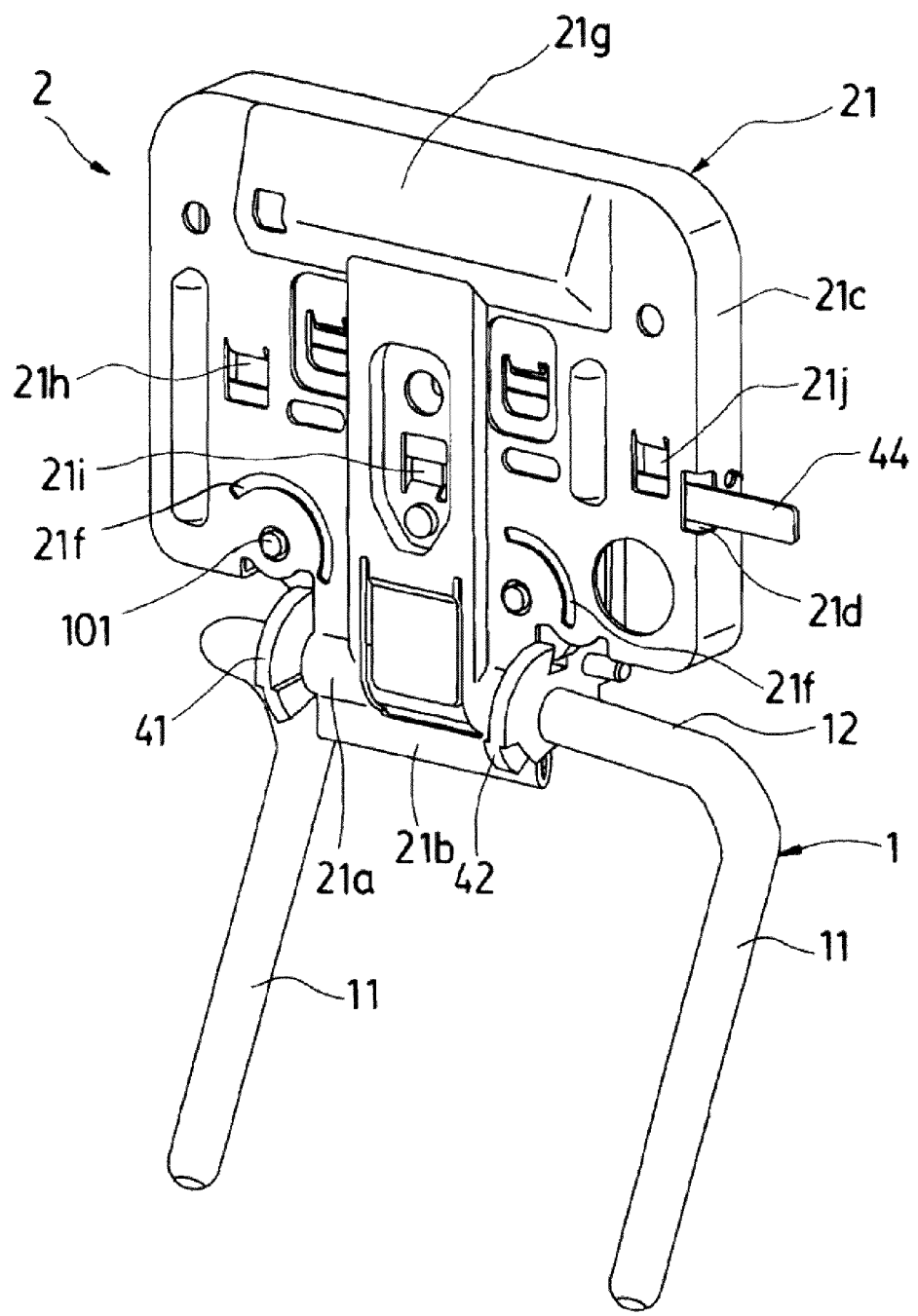
FIG. 4 is a perspective view of a headrest frame to which a pillar is assembled and a lock mechanism, viewed from the side on which these elements are in contact with the head.
Figure 5:
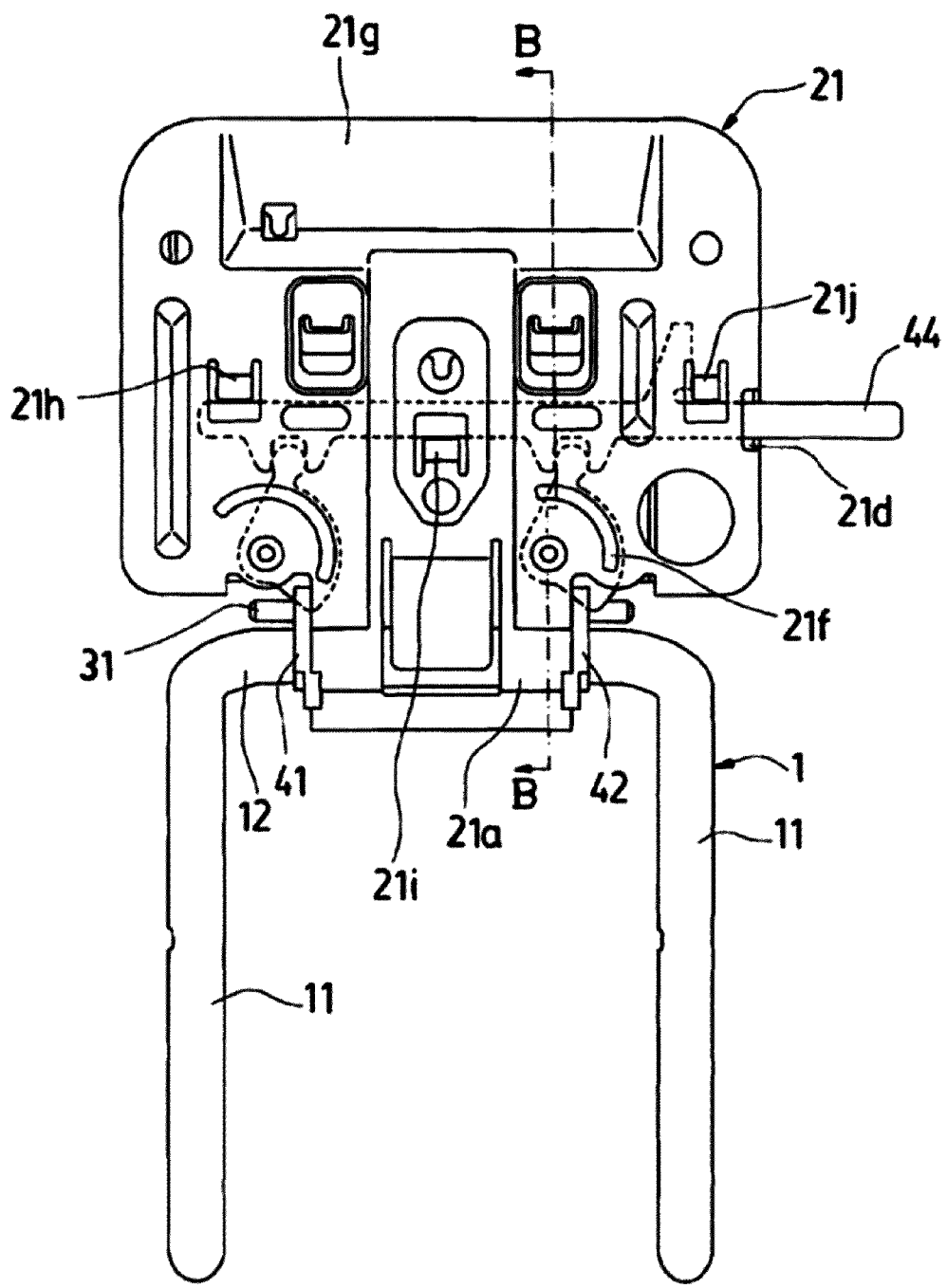
FIG. 5 is a front view of FIG. 4.

As shown in FIGS. 3 to 5, the main frame 21 of this embodiment consists of a rectangular plate body. The substantially semicircular concave part 21a is formed in the lower part of the main frame 21, a crimping part 21b is formed continuously with the concave part 21a, and a jutting-out part 21g is formed on the upper side of the main frame 21.

Also, at the outer periphery of the main frame 21, a folded wall part 21c is formed excluding a predetermined range on both sides of the concave part 21a.

On the inside of the main frame 21, boss parts 21e are formed so as to project toward the inside in portions through which the rivet 101 serving as a rotation shaft for the ratchet 46 is inserted. Also, on the outer periphery side of each of the boss parts 21e, a substantially bow-shaped protruding part 21f projecting toward the rotating surface of the ratchet 46 is formed.

On one side surface of the folded wall part 21c, a cut-away part 21d is formed. The ratchet lever 44 is inserted through this cut-away part 21d. Also, on the extension of the cut-away part 21d, three tongue pieces 21h, 21i and 21j bent toward the inside are formed so as to serve as a movement guide when the ratchet lever 44 is inserted.

Among these three tongue pieces 21h, 21i and 21j, the two tongue pieces 21h and 21j are formed spacedly in the right-and-left direction by being bent to the inside from the upside to the downside. In a substantially central portion between the tongue pieces 21h and 21j arranged in the right-and-left direction, one tongue piece 21i bent to the inside from the lower side to the upper side is formed. The ratchet lever 44 is inserted with the end parts of the three tongue pieces 21h, 21i and 21j being used as guides. The ratchet lever 44 of this embodiment constitutes a part of the lock mechanism 4, described later.

Figure 7:
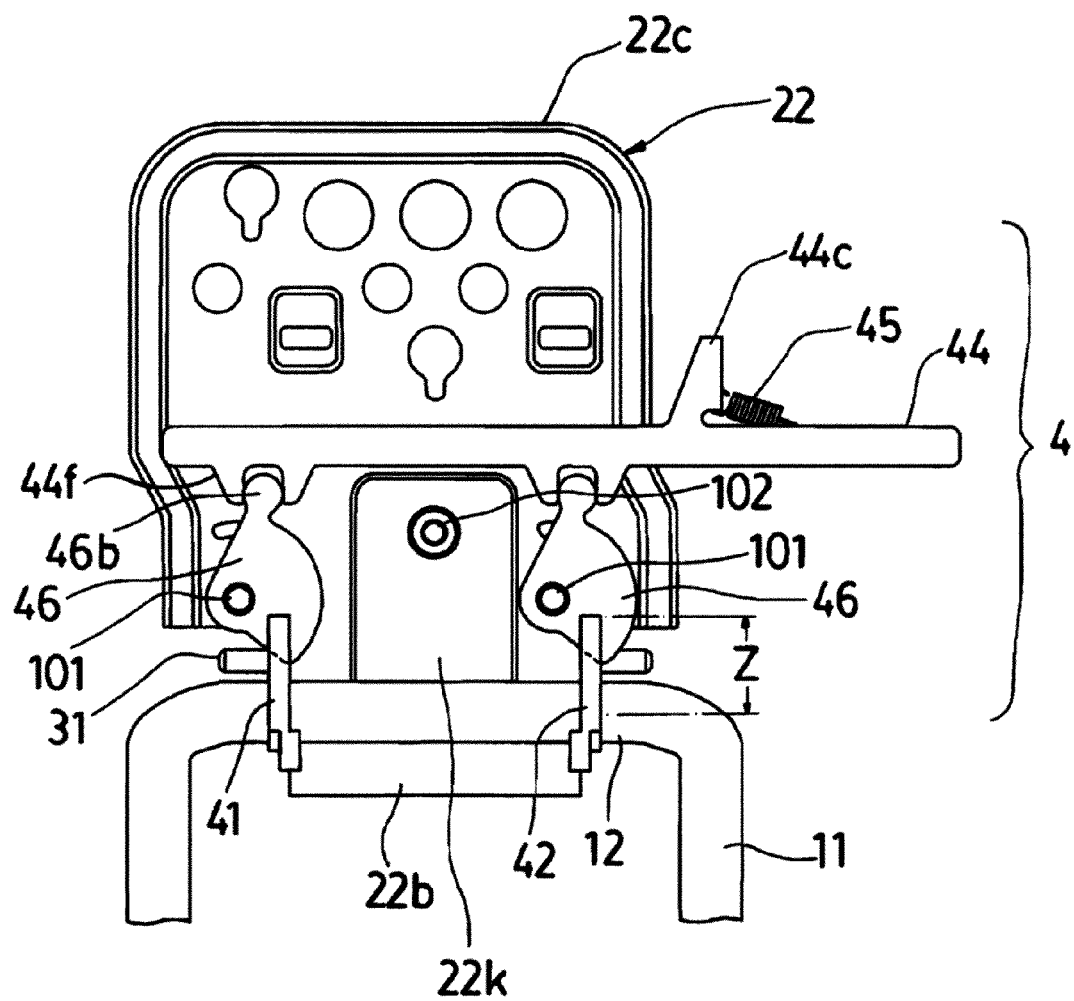
FIG. 7 is an explanatory view of a lock mechanism.
Figure 8:
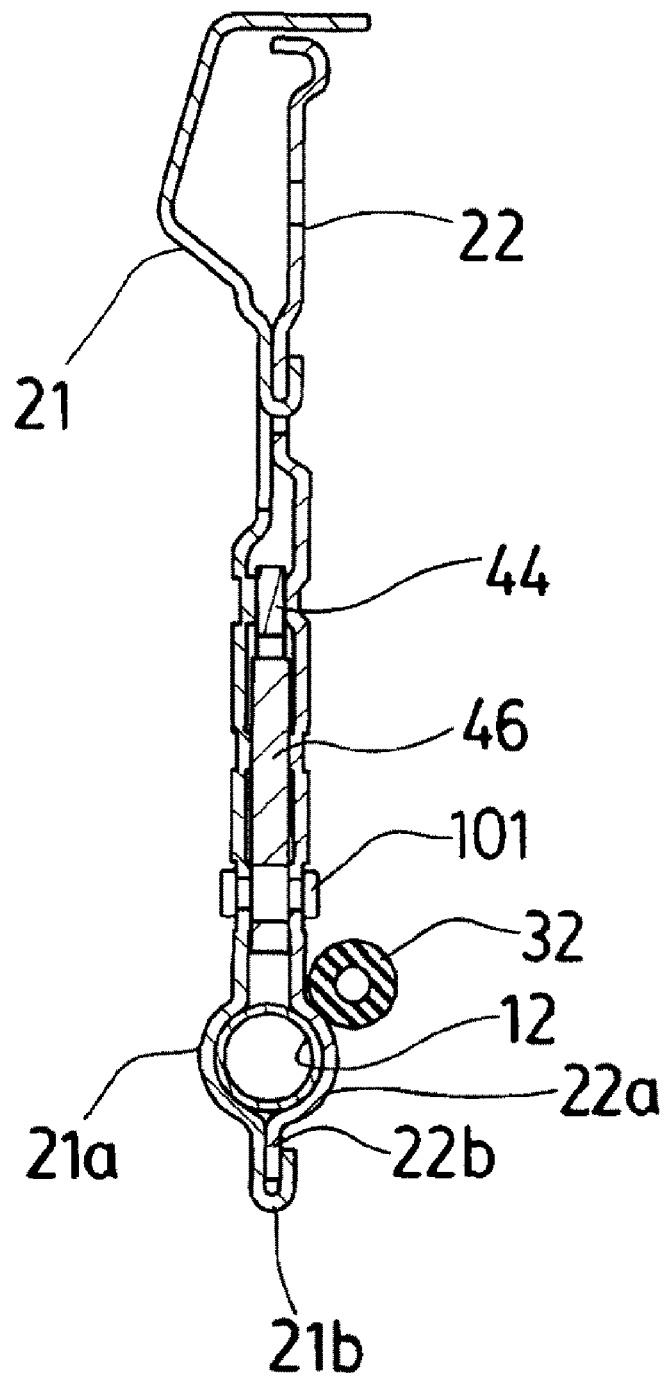
FIG. 8 is a sectional view taken along the line B-B of FIG. 5.

As shown in FIGS. 3, 6 and 7, the sub frame 22 of this embodiment consists of a rectangular plate body, and is configured in a shape such that the upper part thereof extending from a predetermined portion, in this example, a position at which the ratchet lever 44 is disposed, is offset to one side (the side distant from the cut-away part 21d). In the lower part of the sub frame 22, a substantially semicircular concave part 22a is formed, and a crimping part 22b is formed continuously with the concave part 22a. Also, on the opposite side to the crimping part 22b, an urge receiving part 22k is formed continuously with the concave part 22a. A folded part 22c folded to the inside is formed excluding the substantially semicircular concave part 22a side, that is, on the upper side and the right and left sides.

On the sub frame 22, boss parts 22e are formed so as to project toward the inside at positions aligning with the boss parts 21e of the main frame 21, that is, in portions in which the rivet 101 serving as a rotation shaft for the ratchet 46 is inserted through.

Also, on the inside of the sub frame 22, substantially bow-shaped protruding parts 22f projecting toward the rotating surface of the ratchet 46 are formed so as to align with the substantially bow-shaped protruding parts 21f formed on the main frame 21.

As shown in FIGS. 3 and 6, the headrest frame urging element(s) 3 serving as a frame urging element(s), which is used to urge the headrest frame 2 to one side (that is, the tilt side), is made up of a shaft 31, a damper 32, a spring 33, shaft insertion holes 41d and 42d formed in the latch plates 41 and 42 constituting the lock mechanism 4, and the aforementioned urge receiving part 22k.

The shaft 31 is a round bar, and the damper 32 is formed by a hollow cylindrical body made of rubber. Also, the spring 33 is disposed so that one end 33a thereof is locked to the latch plate 41 and the other end 33b side is in contact with the damper 32, and is brought into contact with the aforementioned urge receiving part 22k with the other end 33b thereof being used as a wide pressing part. By the urging, at the normal time, the headrest frame 2 is subjected to an urging force in the tilt direction.

Assembling is performed by inserting the shaft 31 through the two latch plates 41 and 42. At this time, the shaft 31 is inserted through the shaft insertion hole 41d (or 42d) in one latch plate 41 (or 42), and then the damper 32 and the spring 33 are put on the shaft 31. Thereafter, the shaft 31 is inserted through the shaft insertion hole 42d (or 41d) in the other latch plate 42 (or 41).

The symbol 4 shown in FIG. 7 denotes the lock mechanism, which is provided between the pillar 1 and the headrest frame 2.

The lock mechanism 4 of this embodiment includes, as main components, the latch plates 41 and 42 serving as a locking member, the ratchet lever 44 serving as an operation lever, the ratchets 46 serving as a fixing member, and a spring 45 serving as a ratchet lever urging element(s) (operation lever urging element(s)).

The latch plates 41 and 42 are fixed to the transverse shaft part 12 of the pillar 1 in the direction perpendicular to the axis of the transverse shaft part 12 by welding or the like at a predetermined interval as described above.

On the upper sides of the latch plates 41 and 42, as shown in FIG. 9, engagement groove parts 41*a* and 42*a* are formed along the transverse shaft part 12.

The latch plate 41, 42 is formed with an arcuate outer periphery part 41*b*, 42*b* and a stopper part 41*c*, 42*c* formed by a wall of a portion beyond the engagement groove part 41*a*, 42*a*.

In this embodiment, the latch plates 41 and 42 are formed so that the engagement groove parts 41*a* and 42*a* have a different shape. The engagement groove part 42*a* of the latch plate 42 provided on the right-hand side in FIG. 9 is formed so that the width thereof on the upper end side is narrower, and the engagement groove part 41*a* of the latch plate 41 provided on the left-hand side in FIG. 9 is formed so that the groove width is constant in the up-and-down direction. On the end part side (the lower side in FIG. 9) of the latch plate 41, 42, a stopper part 41*e*, 42*e* is formed.

As for the configurations of the latch plates 41 and 42, the engagement groove part 42*a* of at least one latch plate (in this embodiment, the latch plate 42) is formed so that the upper end side tilts to the inside with a portion somewhat wider than the thickness of the ratchet 46 being left. Therefore, the contact points of the latch plate 42 and the ratchet 46 are the upper end side of the engagement groove part 42*a* of the latch plate 42 and a lock engagement part 46*c* of the ratchet 46 shown in FIG. 11. The lock engagement part 46*c*, which is the contact point, is a side surface position at the time when the ratchet 46 comes into contact with the groove bottom of the engagement groove part 42*a* of the latch plate 42. The symbol 46*d* shown in FIG. 11 denotes a locus formed by moving the ratchet 46 from a disengagement position at which the ratchet 46 comes off the engagement groove part 42*a* to a position at which the ratchet 46 comes into contact with the groove bottom of the engagement groove part 42*a* of the latch plate 42.

That is to say, as shown in FIG. 7, the configuration is made such that the distance Z from the transverse shaft part 12 of the pillar 1 to a portion in which the upper end side of the latch plate 42, which is formed so as to be narrower, comes into contact with the ratchet 46 is long as compared with any other portion of the ratchet 46. Therefore, the contact point separates from the axis of the transverse shaft part 12 of the pillar 1 (the rotation center of the headrest frame 2), so that when the ratchet 46 moves from the engagement position to the disengagement position (when the lock is released), a releasing load placed by the urging force of the headrest frame urging element(s) 3 (the spring 33) from the rear can be decreased, and the adjustment of releasing load can be made. In the case of this embodiment, since the engagement groove part 42*a* of the latch plate 42 located on the side engaging with an operation knob of the ratchet lever 44 is formed so as to be narrow, a force from the ratchet lever 44 can be transmitted reliably.

Also, the latch plate 41, 42 is provided with the shaft insertion hole 41*d*, 42*d* for inserting the shaft 31.

Figure 10:
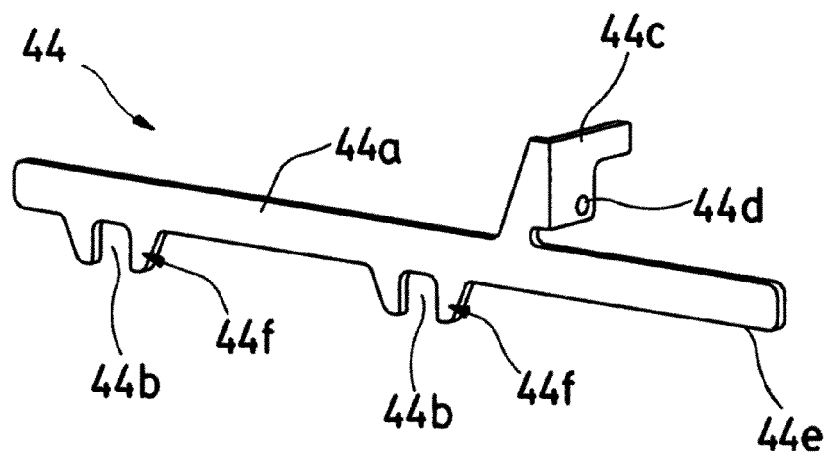
FIG. 10 is a perspective view of a ratchet lever.

As shown in FIG. 10, the ratchet lever 44 of this embodiment is formed by a slender plate body, and has a plate main body 44*a* sliding in the transverse direction. The plate main body 44*a* is formed with engagement concave parts 44*b*, 44*b* directed to the pillar 1 side. On the opposite side to the engagement concave parts 44*b*, 44*b*, a movement locking part 44*c* is formed so as to extend from the plate main body 44*a* in the substantially perpendicular direction, and the movement locking part 44*c* is formed with a locking part 44*d* for the ratchet lever urging element(s) 45.

The engagement concave parts 44*b*, 44*b* are formed between jutting-out parts 44*f*, 44*f* jutting out from the plate main body 44*a* to the pillar 1 side so as to hold circular one end side of the ratchet 46 and to allow the ratchet 46 to rotate.

To the ratchet lever 44, one end of the ratchet lever urging element(s) (spring) 45 is connected so that the ratchet 46 is urged in the engagement groove part direction of the latch plate 41, 42. The symbol 44*e* denotes end part side engaging with the operation knob.

Figure 11:
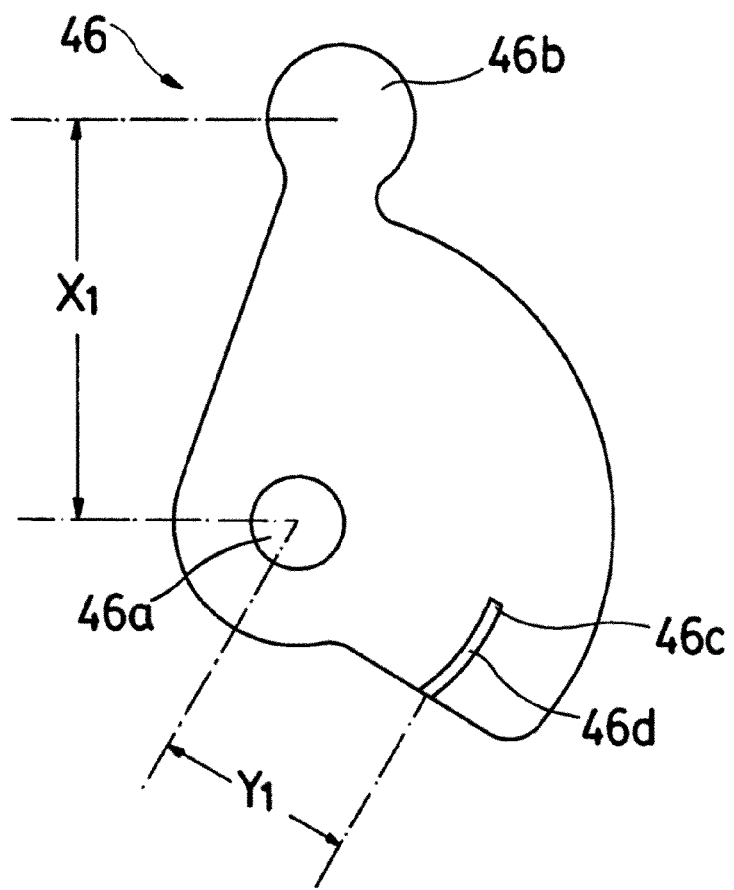
FIG. 11 is a plan view of a ratchet.

As shown in FIGS. 3, 7 and 11, the ratchet 46 of this embodiment has a rotation hole 46*a* serving as a rotation axis, an engagement part 46*b*, and the lock engagement part 46*c*, and is pivotally supported on the headrest frame 2 with the rivet 101 disposed between the main frame 21 and the sub frame 22 being used as a rotation shaft.

The engagement part 46*b* on one end side of the ratchet 46 engages with the engagement concave part 44*b*, 44*b* of the ratchet lever 44, and the lock engagement part 46*c* engages with the engagement groove part 41*a*, 42*a* of the latch plate 41, 42, by which the raised state of the headrest HR is maintained.

The engagement part 46*b* on one end side of the ratchet 46 engages with the engagement concave parts 44*b*, 44*b* of the ratchet lever 44, and the surface touching the engagement concave part 44*b*, 44*b* is formed into a circular shape, preferably a complete round shape. Thereby, the ratchet 46 can be rotated following the movement of the ratchet lever 44 stably. The ratchet 46 has a thickness larger than that of the ratchet lever 44. Therefore, the ratchet 46 can be prevented from coming off the ratchet lever 44.

Also, as shown in FIG. 11, the ratchet 46 is formed so that the distance X1 between the center of the rotation hole 46*a* of the ratchet 46 and the center position of the engagement part 46*b* on one end side of the ratchet 46 engaging with the engagement concave part 44*b* of the ratchet lever 44 is longer than the distance Y1 between the center of the rotation hole 46*a* of the ratchet 46 and the position of the lock engagement part 46*c* on the other end side of the ratchet 46 engaging crossingly with the engagement groove part 42*a* of the latch plate 42 (in the case of FIG. 11, the engagement locus 46*d*). Thereby, the releasing load at the time when the lock of the ratchet 46 to the latch plate 41, 42 is released can be decreased.

That is to say, in this embodiment, in the raised state, the ratchet 46 pivotally supported on the headrest frame 2 is urged in the tilt direction by the spring 33, so that friction is generated in a portion in which the ratchet 46 comes into contact with the engagement groove part 42*a* of the latch plate 42. Therefore, when the ratchet 46 is rotated from the engagement position at which the ratchet 46 is positioned in the engagement groove part 42*a* of the latch plate 42 to the disengagement position at which the ratchet 46 comes off the engagement groove part 42*a*, frictional resistance is exerted, so that a difficult-to-rotate state is formed.

However, the ratchet 46 of this embodiment is formed so that the distance X1 between the center (supporting point) of the rotation hole 46*a* and the center position (power point) of the engagement part 46*b* to which a weight is applied by the ratchet lever 44 is longer than the distance Y1 between the center (supporting point) of the rotation hole 46*a* and the position (point of application) of the lock engagement part 46*c* engaging crossingly with the engagement groove part 42*a* of the latch plate 42. Therefore, the ratchet 46 can be moved from the engagement position to the disengagement position with less force. That is to say, a so-called link ratio can be set, and thereby the releasing load can be adjusted.

Also, the ratchet lever 44 is configured so as to hold circular one end side of the ratchet 46 and to allow the ratchet 46 to rotate. Therefore, the engagement part 46b on one end side of the ratchet 46 is held by and engages normally with the engagement concave part 44b of the ratchet lever 44, so that the ratchet 46 can be prevented from turning by one. That is to say, the ratchet 46 rotates smoothly following the movement of the ratchet lever 44 constantly, malfunction is prevented, and the switching-over by the lock mechanism 4 can be performed reliably.

The ratchet 46 of this example can rotate in the range of rotation angle of 20 to 40 degrees around the rotation hole (rotation axis) 46a.

If the ratchet 46 is configured so as to turn in the range of rotation angle of 20 to 40 degrees around the rotation hole (rotation axis) 46a thereof, the displacement in the transverse direction of the ratchet lever 44 for the disengagement caused by the rotation of the latch plates 41, 42 and the ratchet 46 from the engagement position to the disengagement position and the rotation of the ratchet 46 can be adjusted so as to be optimum. Thus, the displacement relating to the operation caused by the lock mechanism 4 can be adjusted.

Figure 12:
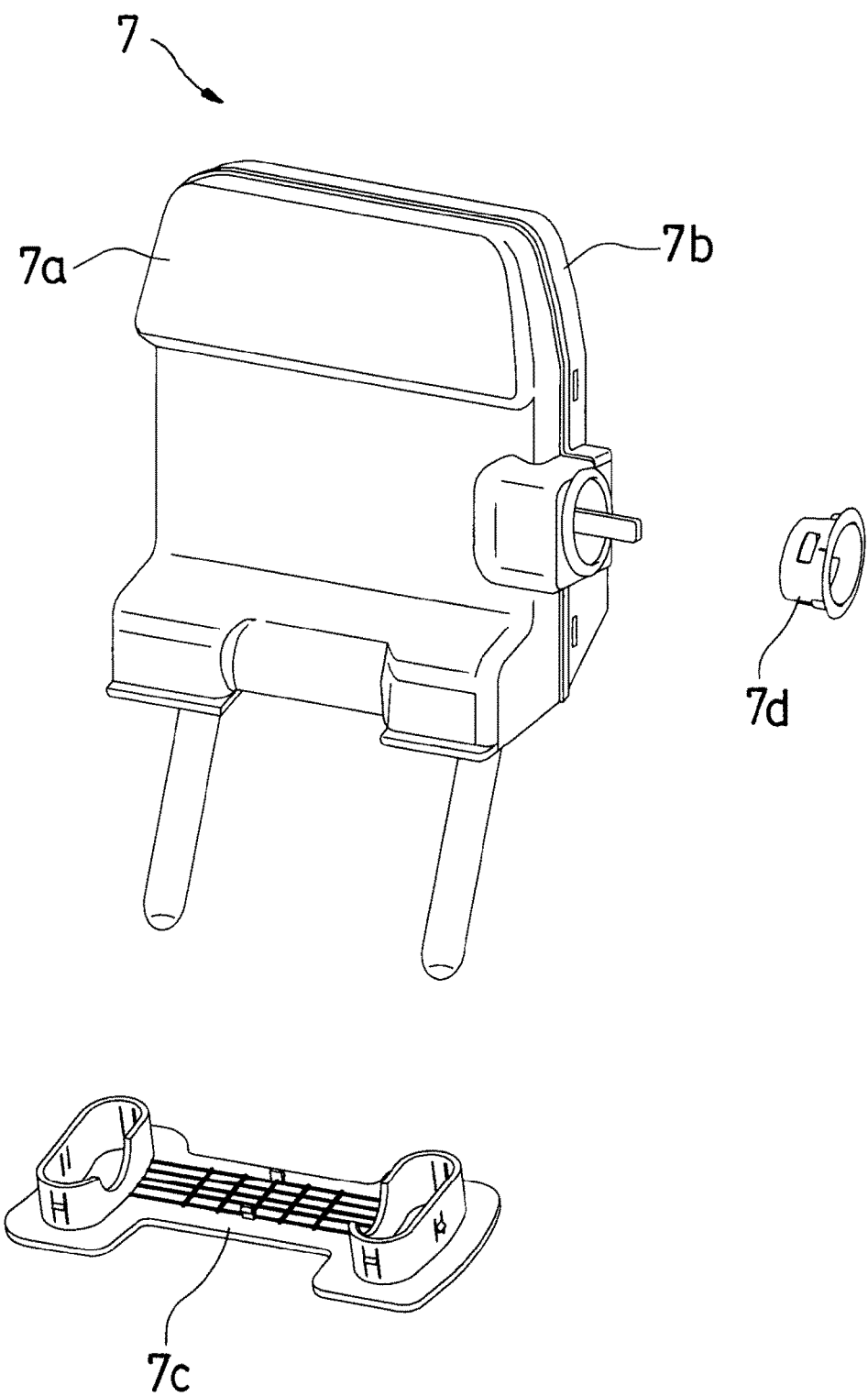
FIG. 12 is a partially exploded perspective view of a cover.

FIG. 12 shows an assembled state of a cover material 7. After the pillar 1 serving as a support member, the headrest frame 2 serving as a frame, the headrest frame urging element(s) 3 serving as a frame urging element(s), the lock mechanism 4, and the like have been assembled, these elements are covered with the cover material 7. The cover material 7 consists of a front cover member 7a, a rear cover member 7b, and a seat cover fastening cover member 7c, which are made of a resin, and a garnish 7d for preventing the operation knob of operation section and the like from coming off.

Figure 2:
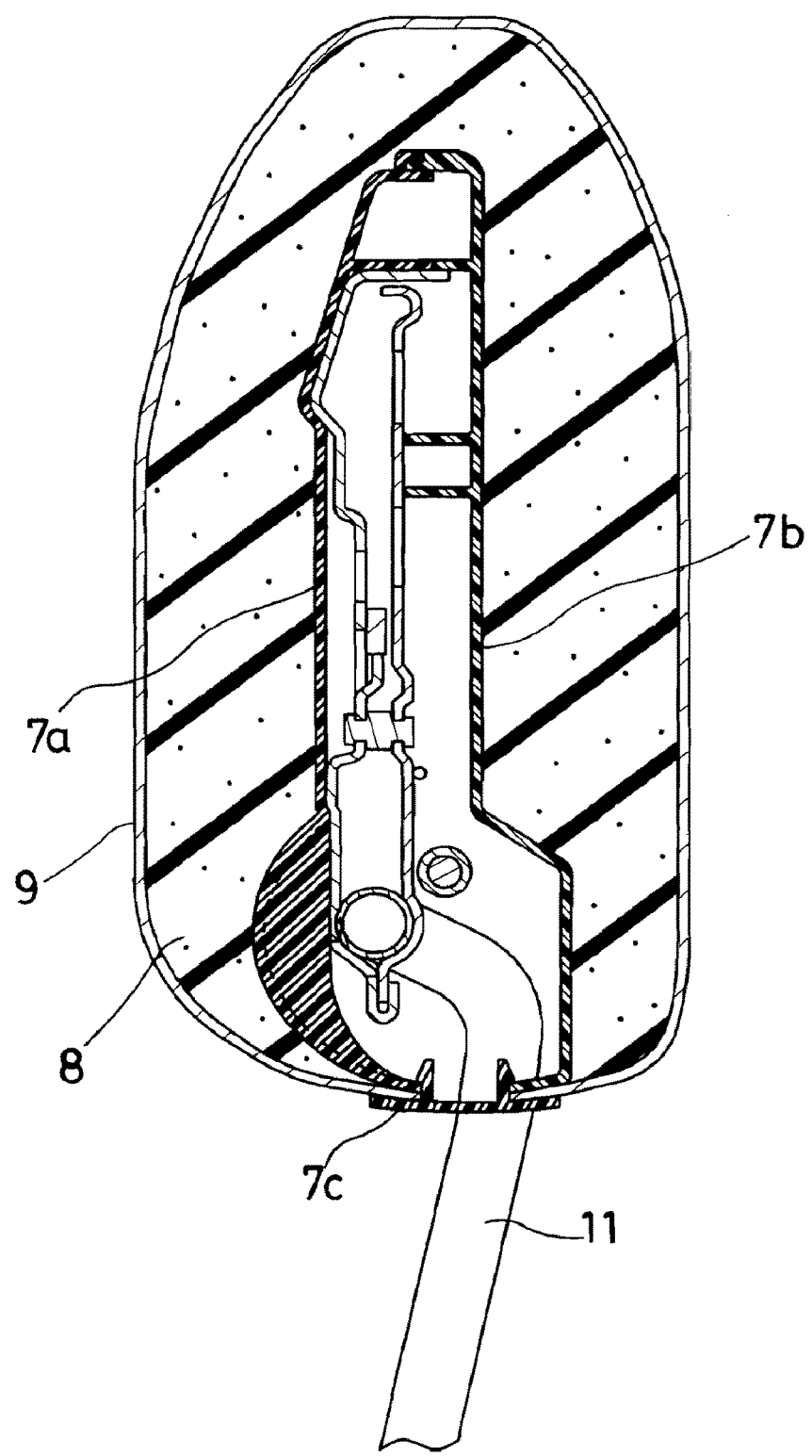
FIG. 2 is a sectional view taken along the line A-A of FIG. 1.

As shown in FIG. 2, a pad material 8 is disposed at the outer periphery of the cover material 7, and a seat cover material 9 covers the pad material 8.

The seat cover material 9 of this embodiment is formed into a bag shape one end side of which is open. Various members surrounded by the cover material 7 are mounted through the opening of the seat cover material 9 and are arranged in the cavity of a mold, resin foam is poured and expanded, and the seat cover terminal part on the opening side of the seat cover material 9 is covered by the seat cover fastening cover material 7c on the pillar 1 side, by which the headrest HR is integrally molded.

Next, the operation of the headrest HR configured as described above is explained.

Since the headrest HR is configured so that the headrest frame 2 is rotatably installed on the transverse shaft part 12 of the pillar 1, and is fixed by the lock mechanism 4, the headrest HR at the normal time can protect the seater's head when being subjected to a shock in a raised state.

That is to say, the pillar 1 mounted on the upper part of the backrest seat S2 has the transverse shaft part 12, and the transverse shaft part 12 of the pillar 1 is rotatably engaged with the headrest frame 2. The headrest 2 is urged so as to be tilted by the headrest frame urging element(s) 3 at the normal time. In the raised state, the state in which the tilt is locked is formed by the lock mechanism 4 provided between the headrest frame 2 and the pillar 1. This raised state is shown in FIGS. 4 to 7. Therefore, as shown in FIG. 2, the headrest HR is in a raised state.

In the lock mechanism 4, when the engagement part 46b on one end side of the ratchet 46 is pushed by the sliding of the ratchet lever 44, the ratchet 46 rotates around the rotation axis, and the lock engagement part 46c on the other end side of the ratchet 46 moves in the direction of engaging crossingly with the engagement groove part 41a, 42a of the latch plate 41, 42.

In the raised state, the ratchet 46 is positioned in the engagement groove part 41a, 42a and comes into contact with the latch plate 41, 42, the pillar 1 and the headrest frame 2 are in a locked state, and the raised state of the headrest HR is maintained.

By operating the ratchet lever 44 against the ratchet lever urging element(s) 45, the engagement part 46b on one end side of the ratchet 46 is pushed, and the ratchet 46 is rotated around the rotation axis. Therefore, the ratchet 46 retracts from the engagement groove part 41a, 42a, so that the ratchet 46 comes off the engagement groove part 41a, 42a of the latch plate 41, 42. At this time, since the spring 33, which is the headrest frame urging element(s) 3, urges the headrest frame 2 in the tilt direction at the normal time, the headrest HR tilts around the transverse shaft part 12, by which the storage state is formed.

As described above, when the head support state in which the headrest HR is raised with respect to the backrest seat S2 is formed and when the storage state is formed by tilting the headrest HR from the head support state, in the present invention, as the lock mechanism 4, the ratchet lever 44, the latch plates 41 and 42, and the ratchets 46 are used. Also, the engagement position and the disengagement position are switched over via the ratchet 46 one end side of which engages with the engagement concave part 44b of the ratchet lever 44 and the other end side of which engages crossingly with the engagement groove part 41a, 42a of the latch plate 41, 42. Therefore, the lock mechanism 4 itself can be configured so as to be compact without requiring a wide width. Moreover, since at least one of the engagement groove parts 41a and 42a of the latch plates 41 and 42 serving as a locking member is formed so that the upper end side is narrow, the contact point of the ratchet 46 with the latch plate 42 separates from the contact point with the transverse shaft part 12 of the pillar 1. Therefore, when the lock is released, the releasing load placed by the urging force of the headrest frame urging element(s) 3 (the spring 33) from the rear can be decreased.

Also, at the normal time, the ratchet lever 44 is urged by the ratchet lever urging element(s) 45 in the direction such that the ratchet 46 is engaged with the engagement groove part 41a, 42a of the latch plate 41 42. When the ratchet lever 44 is operated against the ratchet lever urging element(s) 45, the ratchet 46 comes off the engagement groove part 41a, 42a, and the headrest frame 2 is tilted to the storage state by the headrest frame urging element(s) 3, so that the headrest HR tilts down. Therefore, the lock can be released by one operation (one action).

Furthermore, since one end side of the ratchet 46 touching the engagement concave part 44b of the ratchet lever 44 is formed into a circular shape, the ratchet 46 turns smoothly in the engagement concave part 44b of the ratchet lever 44 with respect to the movement of the ratchet lever 44. Therefore, the ratchet 46 can be engaged with and disengaged from the engagement groove part 41a, 42a of the latch plate 41, 42, so that the lock can be released exactly.

When the headrest HR in the storage state is raised to the raised state, since in the normal time, the ratchet lever 44 is urged by the ratchet lever urging element(s) (spring) 45, and the ratchet 46 is urged in the engagement groove part 41a, 42a direction of the latch plate 41, 42, if the headrest HR is raised by a hand, the ratchet 46 rotates, and the lock engagement part 46c engages with the engagement groove part 41a, 42a of the latch plate 41, 42, by which the locked state is formed.

In the above-described embodiment, the pillar 1, the latch plate 41, 42 serving as a locking member for the lock mechanism 4, and the ratchet 46 serving as a fixing member each are provided in number of two. However, the number of these members may be one or may be three or more. Needless to say, the number of engagement concave part 44b of the ratchet lever 44 serving as an operation lever may be one or may be plural accordingly.

| DESCRIPTION OF SYMBOLS | |
|---|---|
| 1 | pillar |
| 2 | headrest frame |
| 3 | headrest frame urging element(s) |
| 4 | lock mechanism |
| 7 | cover material |
| 7a | front cover member |
| 7b | rear cover member |
| 7c | seat cover fastening cover member |
| 7d | garnish |
| 8 | pad material |
| 9 | seat cover material |
| 11 | leg part |
| 12 | transverse shaft part |
| 21 | main frame |
| 21a | concave part |
| 21b | crimping part |
| 21c | folded wall part |
| 21d | cut-away part |
| 21e | boss part |
| 21f | protruding part |
| 21g | jutting-out part |
| 21h, 21i, 21j | tongue piece |
| 22 | sub frame |
| 22a | concave part |
| 22b | crimping part |
| 22c | folded part |
| 22e | boss part |
| 22f | protruding part |
| 22k | urge receiving part |
| 31 | shaft |
| 32 | damper |
| 33 | spring |
| 33a | one end |
| 33b | the other end |
| 41, 42 | latch plate |
| 41a, 42a | engagement groove part |
| 41b, 42b | outer periphery part |
| 41c, 42c | stopper part |
| 41d, 42d | shaft insertion hole |
| 41e, 42e | stopper part |
| 44 | ratchet lever |
| 44a | plate main body |
| 44b, 44b | engagement concave part |
| 44c | movement locking part |
| 44d | locking part |
| 44e | end part side |
| 44f, 44f | jutting-out part |
| 45 | ratchet lever urging element(s) (spring) |
| 46 | ratchet |
| 46a | rotation hole |
| 46b | engagement part |
| 46c | lock engagement part |
| 46d | locus |
| 101, 102 | rivet |
| 101a, 102a | central part |
| 101b, 102b | caulking part |
| S | vehicle seat |
| S1 | seating seat |
| S2 | backrest seat |
| HR | headrest |

The invention claimed is:

1. A headrest having a head support state in which the headrest is raised with respect to a backrest seat and tilted from the head support state to a storage state, comprising:

a support member mounted on an upper part of the backrest seat;
a frame engaged rotatably with the support member;
at least one frame urging element for urging the frame to one side; and
a lock mechanism provided between the frame and the support member,
wherein the lock mechanism comprises:
    a locking member disposed on the support member and formed with an engagement groove part;
    an operation lever having a concave part formed so as to be directed toward a support member side and being movable;
    a fixing member pivotally supported on the frame rotatably and disposed so as to be crossingly engaged with and disengaged from the engagement groove part of the locking member along with a movement of the operation lever; and
    at least one operation lever urging element for urging the operation lever so that the fixing member is urged in the engagement groove part direction of the locking member.

2. The headrest according to claim 1, wherein one end side of the fixing member is formed into a circular shape, and the operation lever holds the circular one end side of the fixing member and allows the rotation of the fixing member.

3. A headrest having a head support state in which the headrest is raised with respect to a backrest seat and being tilted from the head support state to a storage state, comprising:

a pillar having a transverse shaft part and mounted on an upper part of the backrest seat;
a headrest frame rotatably engaged with the transverse shaft part of the pillar by combining a main frame and a sub frame;
at least one headrest frame urging element for urging the headrest frame to one side; and
a lock mechanism provided between the headrest frame and the pillar, wherein
the lock mechanism comprises:
a latch plate disposed on the transverse shaft part of the pillar and formed with an engagement groove part along the transverse shaft part;
a ratchet lever provided with an engagement concave part formed so as to be directed toward a pillar side and sliding in a transverse direction;
a ratchet, one end side of which is engaged with the engagement concave part of the ratchet lever and an other end side of which can be engaged crossingly with the engagement groove part of the latch plate; and
at least one ratchet lever urging element for urging the ratchet lever so that the ratchet is urged in the engagement groove part direction of the latch plate, and
wherein the ratchet is switchable between an engagement position at which the ratchet is positioned in the engagement groove part of the latch plate, and a disengagement position at which the ratchet comes off the engagement groove part.

4. The headrest according to claim 3, wherein one end side of the ratchet held in the engagement concave part of the ratchet lever is formed into a circular shape, and the engagement position and the disengagement position can be switched over by the rotation of the ratchet along with the movement of the ratchet lever.

5. The headrest according to claim 3, wherein the ratchet lever is formed with at least two engagement concave parts, and at least two ratchets are held in and engaged with the engagement concave parts.

6. The headrest according to claim 3, wherein by operating the ratchet lever against the at least one ratchet lever urging element, the ratchet is taken away from the engagement groove part of the latch plate.

7. The headrest according to claim 3, wherein a distance between the rotation axis of the ratchet and a position of one end side of the ratchet engaging with the engagement concave part of the ratchet lever is longer than a distance between the rotation axis of the ratchet and a position of the ratchet engaging with the engagement groove part of the latch plate.

8. The headrest according to claim 3, wherein the ratchet rotates in a range of rotation angle of 20 to 40 degrees around the rotation axis of the ratchet.

9. A vehicle seat provided with a headrest having a head support state in which the headrest is raised with respect to a backrest seat and tilted from the head support state to a storage state, wherein the headrest comprises:
- a support member mounted on an upper part of the backrest seat;
- a frame engaged rotatably with the support member;
- at least one frame urging element for urging the frame to one side; and
- a lock mechanism provided between the frame and the support member, and the lock mechanism comprises:
  - a locking member disposed on the support member and formed with an engagement groove part;
  - an operation lever having a concave part formed so as to be directed toward a support member side and being movable;
  - a fixing member pivotally supported on the frame rotatably and disposed so as to be crossingly engaged with and disengaged from the engagement groove part of the locking member along with a movement of the operation lever; and
  - at least one operation lever urging element for urging the operation lever so that the fixing member is urged in the engagement groove part direction of the locking member.

10. The vehicle seat provided with a headrest according to claim 9, wherein one end side of the fixing member is formed into a circular shape, and the operation lever holds the circular one end side of the fixing member and allows the turning of the fixing member.

11. A vehicle seat provided with a headrest having a head support state in which the headrest is raised with respect to a backrest seat and being tilted from the head support state to a storage state, wherein the headrest comprises:
- a pillar having a transverse shaft part and mounted on an upper part of the backrest seat;
- a headrest frame rotatably engaged with the transverse shaft part of the pillar by combining a main frame and a sub frame;
- at least one headrest frame urging element for urging the headrest frame to one side; and
- a lock mechanism provided between the headrest frame and the pillar,
the lock mechanism comprises:
  - a latch plate disposed on the transverse shaft part of the pillar and formed with an engagement groove part along the transverse shaft part;
  - a ratchet lever provided with an engagement concave part formed so as to be directed toward a pillar side and sliding in a transverse direction;
  - a ratchet one end side of which is engaged with the engagement concave part of the ratchet lever and an other end side of which can be engaged crossingly with the engagement groove part of the latch plate; and
  - at least one ratchet lever urging element for urging the ratchet lever so that the ratchet is urged in the engagement groove part direction of the latch plate, and
wherein the ratchet is switchable between an engagement position at which the ratchet is positioned in the engagement groove part of the latch plate and a disengagement position at which the ratchet comes off the engagement groove part.

12. The vehicle seat provided with a headrest according to claim 11, wherein one end side of the ratchet held in the engagement concave part of the ratchet lever is formed into a circular shape, and the engagement position and the disengagement position can be switched over by the rotation of the ratchet along with the movement of the ratchet lever.

* * * * *